United States Patent
Koike

[11] Patent Number: 5,944,298
[45] Date of Patent: Aug. 31, 1999

[54] ENGINE-MOUNTING BRACKET

[75] Inventor: Yasuhiro Koike, Hamamatsu, Japan

[73] Assignee: Suzuki Motor Corporation, Shizuoka-ken, Japan

[21] Appl. No.: 08/861,829

[22] Filed: May 23, 1997

[30] Foreign Application Priority Data

Jun. 28, 1996 [JP] Japan .................................. 8-188489

[51] Int. Cl.$^6$ .................................................. F16M 3/00
[52] U.S. Cl. ............................................................ 248/674
[58] Field of Search ..................... 248/638, 674, 248/205.1; 403/354, 302; 267/141.2

[56] References Cited

U.S. PATENT DOCUMENTS

| 4,441,684 | 4/1984 | Credle, Jr. | 248/674 |
| 4,697,782 | 10/1987 | Ban | 248/639 |
| 4,779,834 | 10/1988 | Bittner | 248/638 |

FOREIGN PATENT DOCUMENTS

1-202525  8/1989  Japan .

Primary Examiner—Ramon O. Ramirez
Attorney, Agent, or Firm—Flynn, Thiel, Boutell & Tanis, P.C.

[57] ABSTRACT

An object of the present invention is to provide an engine-mounting bracket in which a bracket is formed with cutout portions, thereby eliminating the conventional practice of hole matching, with concomitantly enhanced convenience of assembly, and further which the castability of the engine-mounting bracket provides fewer components, easy manufacture, and reduced costs. To this end, the engine-mounting bracket positioned between an engine and a vehicle body comprises a bracket, which is fitted to one of the engine and the vehicle body, and a bush which is attached to the other thereof. The bush is fixedly secured to the bracket between supporting arm portions of the bracket by means of a fixing bolt. In addition, the bracket has cutout portions defined at the supporting arm portions for fixing the bush to the bracket.

4 Claims, 11 Drawing Sheets

SLEEVE DIAMETER<CUTOUT WIDTH<BOLT & NUT
FLANGE DIAMETER

FIG. 1

SLEEVE DIAMETER<CUTOUT WIDTH<BOLT & NUT
FLANGE DIAMETER

ENGINE-MOUNTING BRACKET

FIELD OF THE INVENTION

This invention relates to an engine-mounting bracket. More particularly, it relates to an engine-mounting bracket in which a bracket is formed with cutout portions, thereby eliminating conventional hole-matching practice. This enhances convenience of assembly. Additionally, as the engine-mounting bracket can be formed by casting, fewer components are involved and costs are reduced.

BACKGROUND OF THE INVENTION

An engine disposed in a vehicle is anchored to a body of the vehicle through an engine-mounting bracket. The engine-mounting bracket suppresses vibration from the engine. As a result, such vibration is intercepted and prevented from being transmitted to the vehicle body or, e.g., to the interior of the vehicle.

An engine-mounting bracket is disclosed in published Japanese Patent Application Laid-Open No. 1-202525. An automobile engine-supporting device, which is disclosed in this publication, has a supporting bracket and a retaining bracket secured to one another by means of a fastening bolt. The supporting bracket supports a support member which is provided on the engine. The retaining bracket is mounted on the vehicle body. In such an automobile engine-supporting structure, a cutout portion is formed at either a bolt insertion-hole of the supporting bracket or a bolt insertion-hole of the retaining bracket for permitting the engine to be turned on an axis extending in a transverse direction of the vehicle in proportion with impact loads. The impact loads are imposed on the engine upon a collision of the vehicle. As a result, the engine is prevented from horizontal movement in a rearward direction of the vehicle upon a frontal collision of the automobile.

Figure 13:
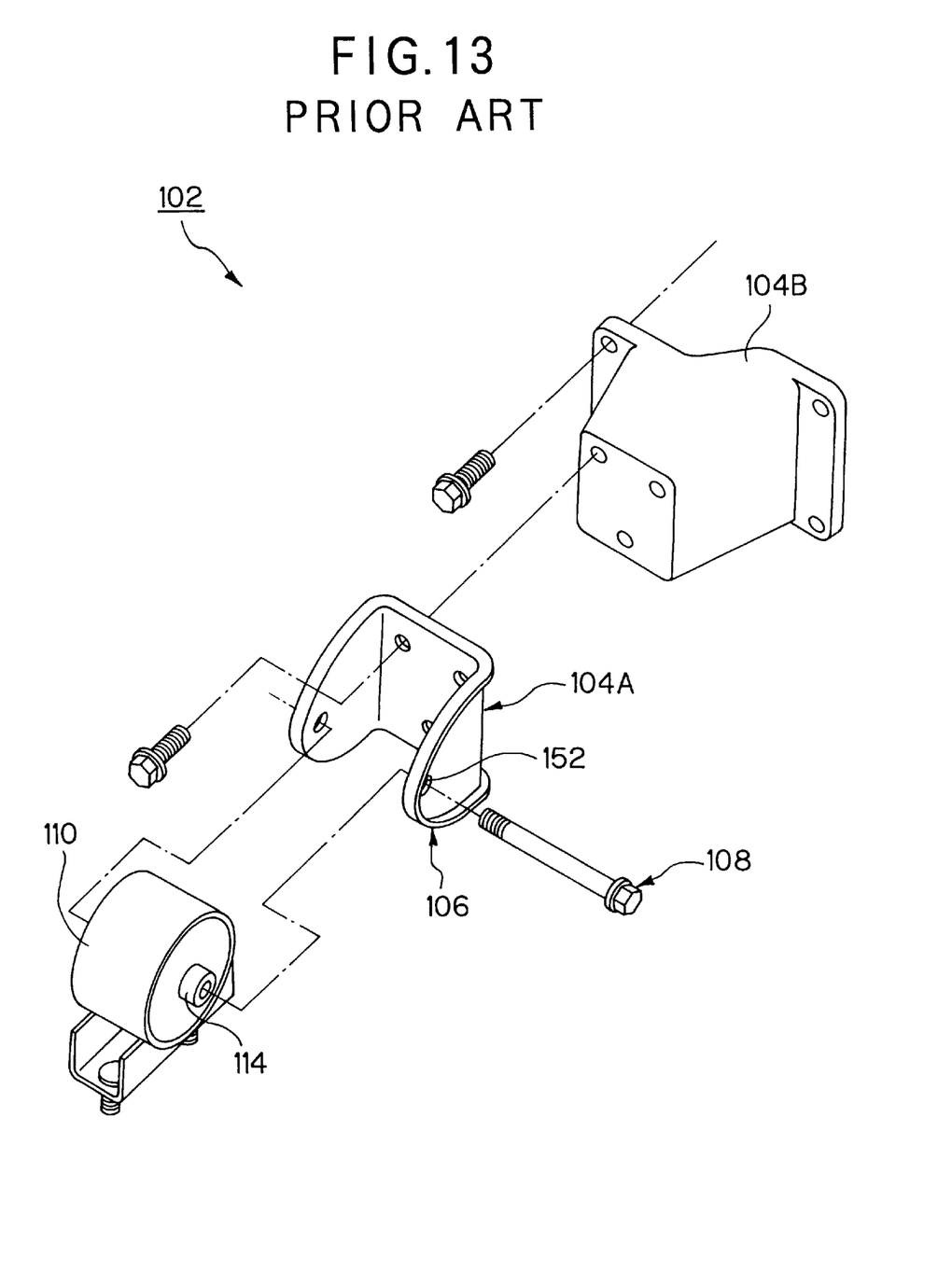
FIG. 13 is a perspective view illustrating an assembled state of an engine-mounting bracket according to first prior art that underlies the present invention.
Figure 14:
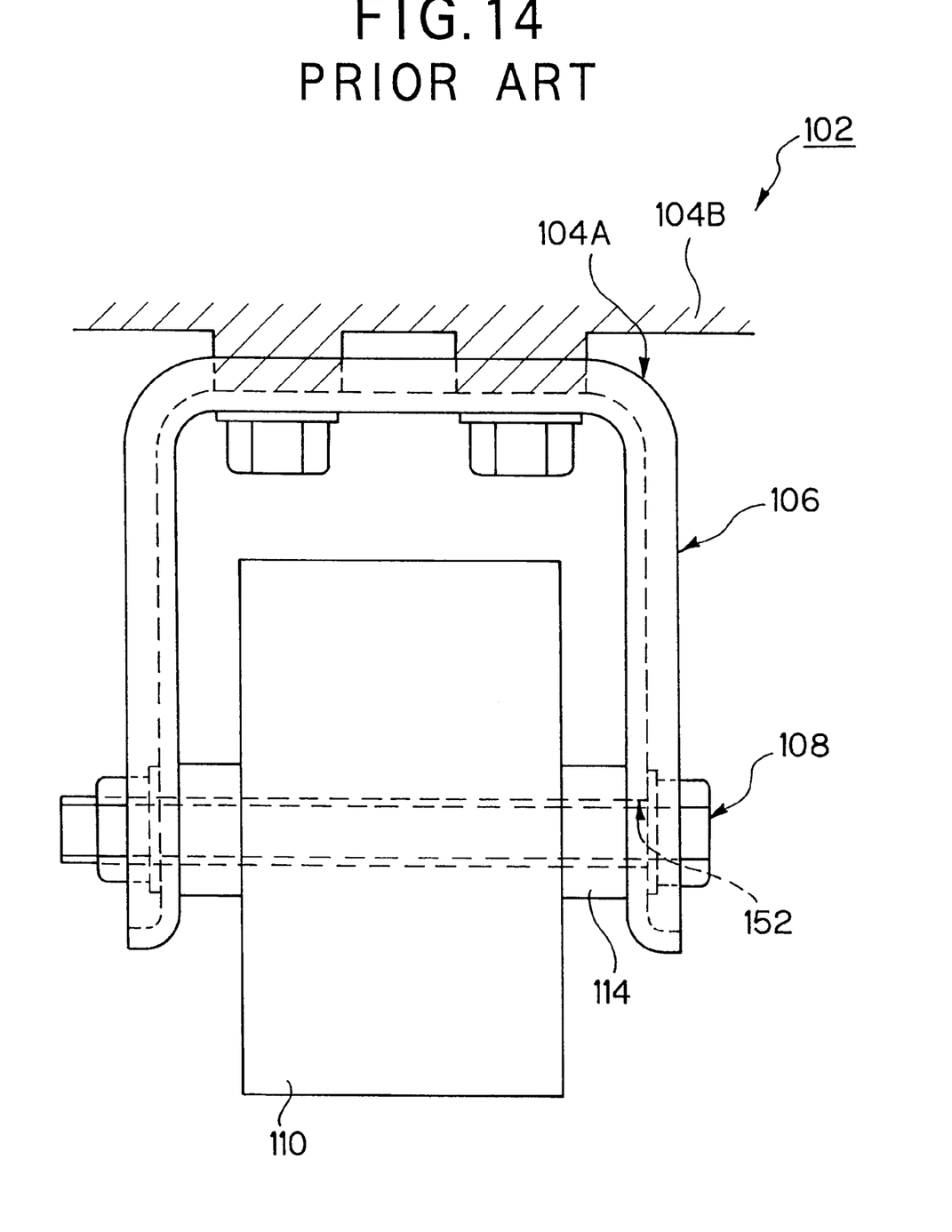
FIG. 14 is an enlarged plan view showing the assembled engine-mounting bracket.

In conventional engine-mounting brackets, an engine-mounting bracket 102, as shown in FIGS. 13 and 14, includes first and second brackets 104A and 104B in which the second bracket 104B is attached to either the engine or the vehicle body, while the first bracket 104A is fitted to the second bracket 104B. The first bracket 104A is formed by a plate-shaped member being bent into a U-shaped configuration in cross-section. The second bracket 104B is formed by way of casting.

In addition, a sleeve 114 is fixed to the first bracket 104A between supporting arm portions 106 by means of a fixing bolt 108. Further, a bush 110 is fixed onto the periphery of the sleeve 114. The bush 110 is attached to the other of the engine and the vehicle body. The supporting arm portions 106 are formed with hole portions 152 for inserting the fixing bolt therethrough.

When desired, the second bracket 104B and the bush 110 may alternately be secured to the engine and the vehicle body.

Since the first bracket 104A is formed by the plate-shaped member being bent into a U-shape in cross-section, the engine-mounting bracket 102 becomes difficult to manufacture. Further, in producing a large number of components, these difficulties lead to increased costs which are disadvantageous from an economical viewpoint.

Additionally, as the supporting arm portions 106 are formed with the hole portions 152, through which the fixing bolt is inserted when the bush and the sleeve are fixed to the bracket, there further arises the inconvenience of the required hole-matching practice, which results in further inconvenience during the assembly process.

In order to avoid the aforesaid inconveniences, the first bracket 104A may be cast of a metallic material such as iron or aluminum. Alternatively, the first and second brackets 104A and 104B may be integrally molded by way of casting.

Figure 15:
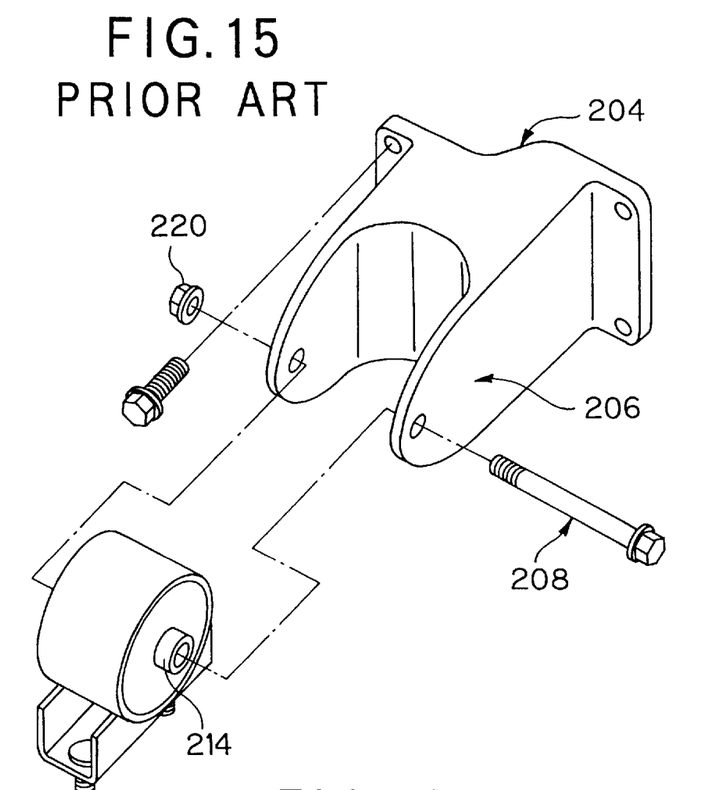
FIG. 15 is a perspective view illustrating an assembled state of an engine-mounting bracket according to second prior art that underlies the present invention.
Figure 16:
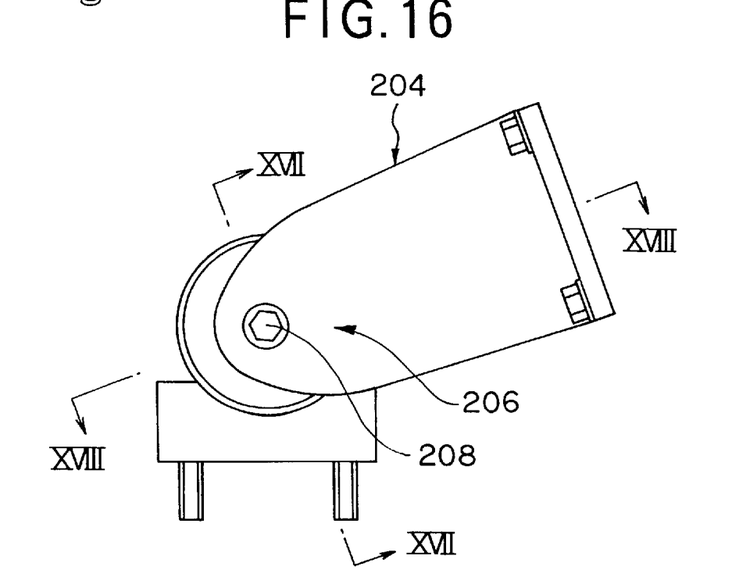
FIG. 16 is a right side view showing the engine-mounting bracket.
Figure 17:
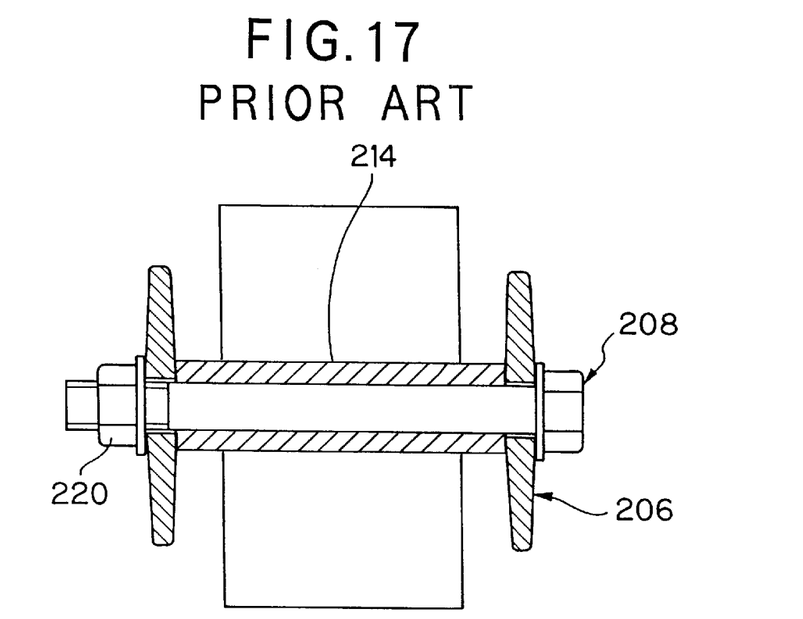
FIG. 17 is a schematic enlarged cross-sectional view taken along line XVII—XVII of FIG. 16.
Figure 18:
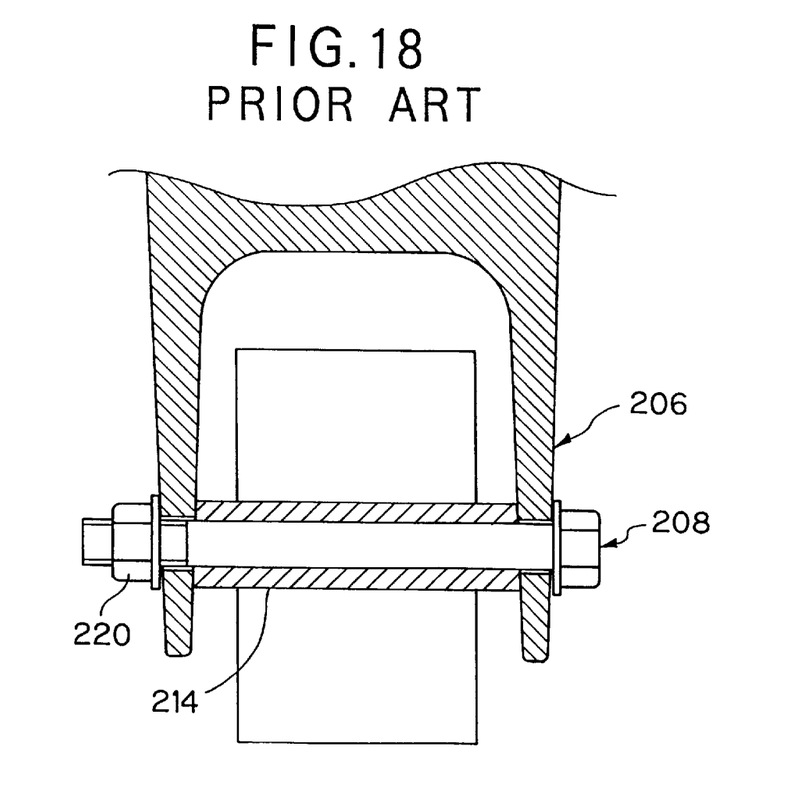
FIG. 18 is a schematic enlarged cross-sectional view, taken along line XVIII—XVIII of FIG. 16.

However, as shown in FIGS. 15 and 16, when a bracket 204 is integrally cast-molded, drafts or tapers are formed at supporting arm portions 206 of the bracket 204, as illustrated in FIGS. 17 and 18. As a result of being formed with the drafts, the supporting arm portions 206 must be machined to remove the drafts so as to provide abutment surfaces against which a fixing bolt 208, a nut 220, and a sleeve 214 are pressed. This causes yet further inconveniences of an additional machining process, difficulties in manufacturing, and increased costs which are disadvantageous from an economical viewpoint.

Figure 19:
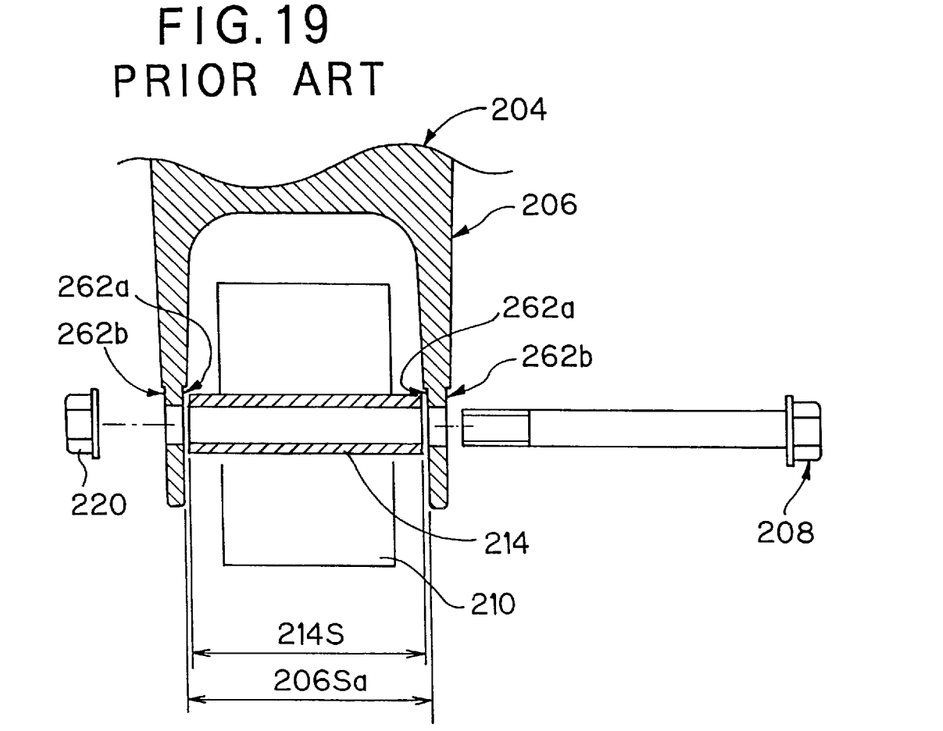
FIG. 19 is a schematic cross-sectional view illustrating an engine-mounting bracket in a state of a bush being assembled on a bracket according to third prior art that underlies the present invention.
Figure 20:
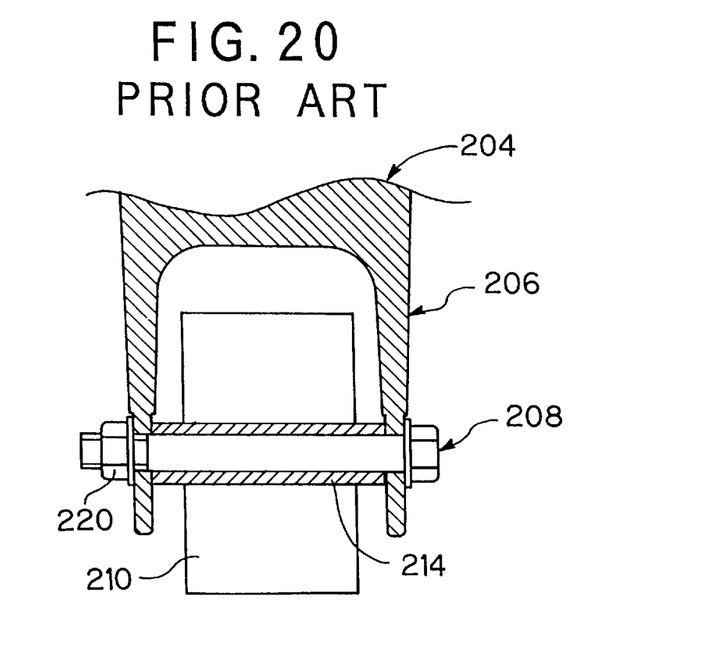
FIG. 20 is a schematic cross-sectional view showing the engine-mounting bracket after the bush is assembled on the bracket.

Further, as illustrated in FIGS. 19 and 20, even when inner and outer sides of the supporting arm portions 206 are formed with respective abutment surfaces 262a and 262b, distance 206Sa between the inner surfaces of the supporting arm portions 206 must be greater than length 214S of the sleeve 214 by a slight amount (i.e. some 2 millimeters). However, when the bush 210 and the sleeve 214 are assembled onto the bracket 204 at the supporting arm portions 206, deflection caused by a difference between the aforesaid distance 206Sa and length 214S is brought about by the tightening force of the fixing bolt 208 and/or that of the nut 220. Such deflection causes stresses which are then exerted on the supporting arm portions 206.

As a result, the integrally cast-molded brackets have inconveniences in that: the supporting arm portions are deficient in flexibility when compared with those formed by sheet metal, which is thus disadvantageous in view of practical use; and, it is difficult to realize the brackets by way of casting.

To overcome or minimize the above-mentioned inconveniences, the present invention provides an engine-mounting bracket disposed between an engine and a vehicle body, comprising a bracket attached to one of the engine and the vehicle body, and a bush fitted to the other thereof, the bush being fixed to the bracket between supporting arm portions of the bracket by means of a fixing bolt, wherein the bracket has cutout portions defined at the supporting arm portions for fixing the bush to bracket.

According to the invention having the above structure, when the bracket and the bush are assembled together, the bush is brought into engagement with the cutout portions that are formed at the supporting arm portions of the bracket. The bush is then fixedly positioned between the supporting arm portions by means of the fixing bolt. As a result, the cutout portions present at the supporting arm portions obviate the need for conventional hole-matching practice, and consequently enhance convenience of assembly. Further, the castability of the engine-mounting bracket provides fewer components and reduced costs.

DETAILED DESCRIPTION

FIGS. 1–5 illustrate a first embodiment of the invention.

Figure 1:
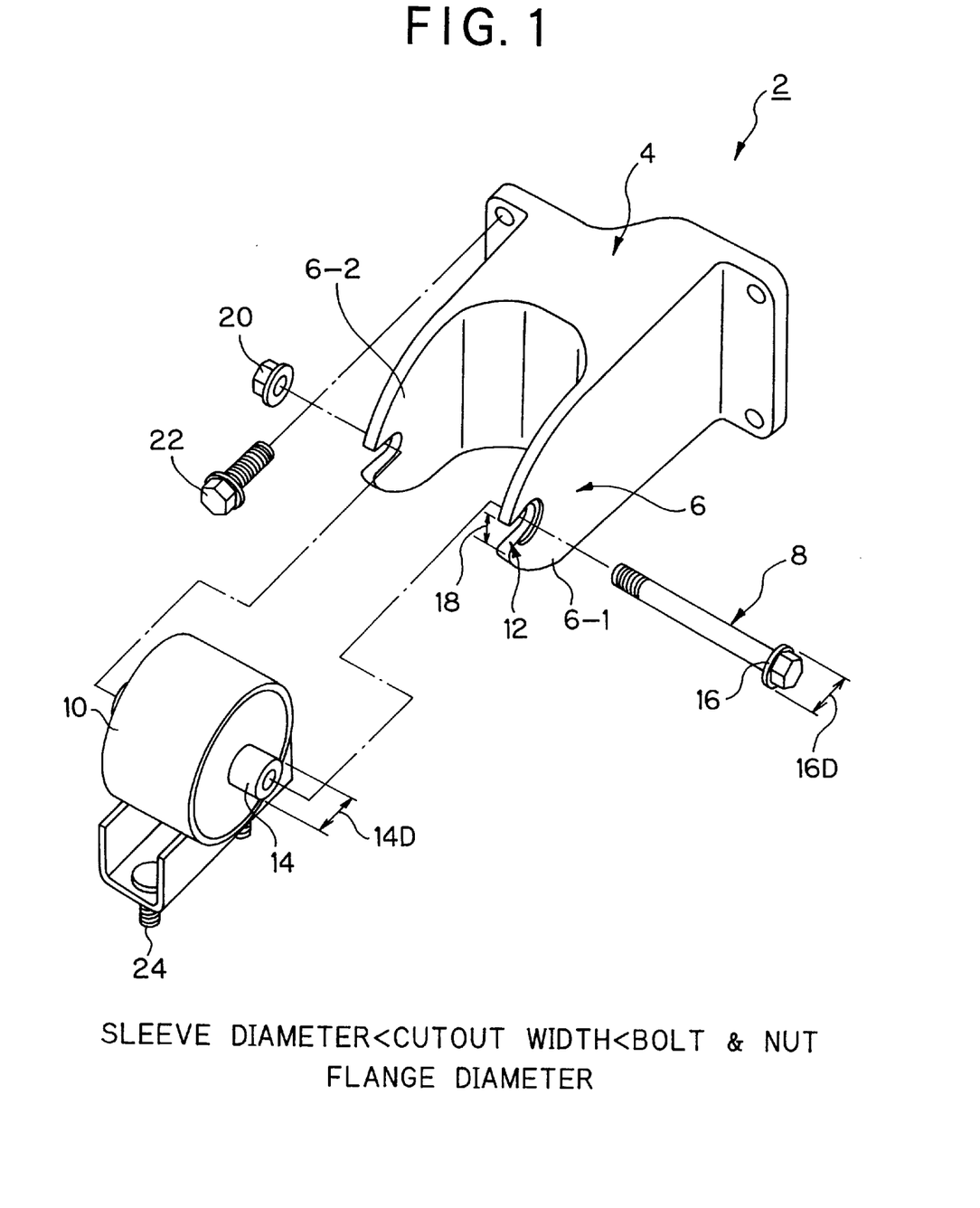
FIG. 1 is a perspective view illustrating an assembled state of an engine-mounting bracket according to a first embodiment of the present invention.

Referring to FIG. 1, the engine-mounting bracket 2 arrangement is shown including a bracket 4 and a bush 10. The bracket 4 is secured to either an engine (not shown) or a vehicle body (not shown). The bush 10 is fitted to the other of the engine or vehicle body opposite the bracket 4. In addition, the bush 10 is fixed to the bracket 4 between supporting arm portions 6 thereof by means of a fixing bolt 8. In addition, the supporting arm portions 6 are formed with cutout portions 12 for fixing the bush 10 to the bracket 4.

Figure 2:
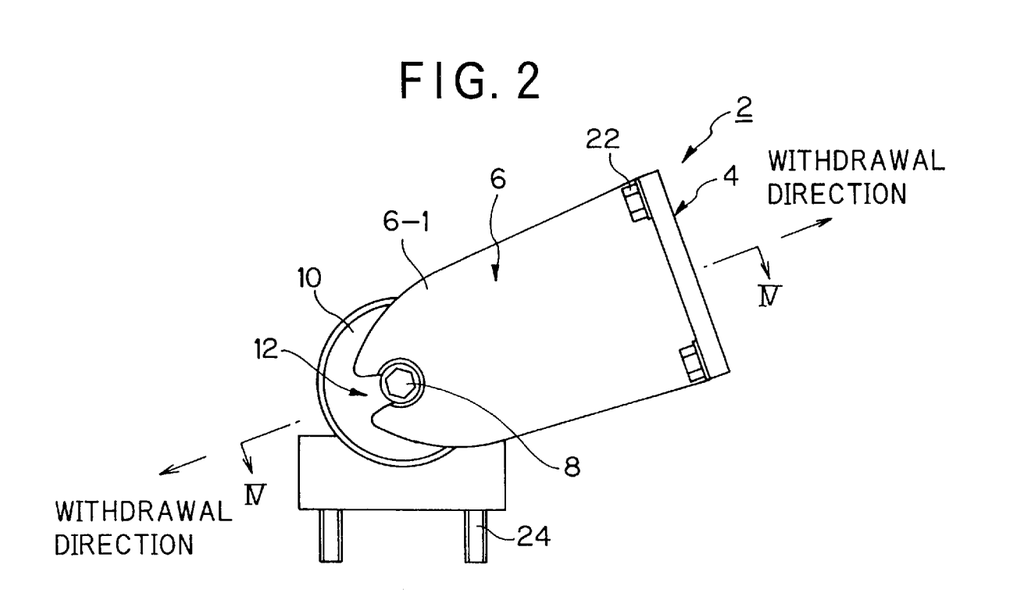
FIG. 2 is a right side view showing the engine-mounting bracket.

In greater detail, the supporting arm portions 6 are cast in a metallic material such as iron or aluminum and are formed into a U-shaped configuration in cross-section. The arm portions 6 are defined with plate-shaped, first and second arm portions 6-1 and 6-2 at both end portions thereof in an opposed and generally parallel relationship to one another. As illustrated in FIGS. 1 and 2, the cutout portions or slots 12 are formed parallel to an outwardly extending direction of the first and second arm portions 6-1 and 6-2, while being formed by being cut inwardly away from respective outer edges or ends of the first and second arm portions 6-1 and 6-2. This cutaway direction accords with a withdrawal direction. The bolt 8 and the under-mentioned nut 20 are seated on outer side surface portions of the first and second arm portions 6-1 and 6-2, and the outer side surface portions are machined to define flats 6f. (See FIG. 5)

Referring to FIG. 1, the cutout portions 12 are shown having cutout width 18, which is greater than diameter 14D of cylindrical sleeve 14, but smaller than diameter 16D of a flange portion 16. The sleeve 14 is provided in the bush 10. The flange portion 16 is formed on the bolt 8. In brief, the following dimensional relationship is established:

sleeve diameter<cutout width<flange portion diameter

In this connection, the above description is made with reference to the flange portion 16; however, if a washer is used on bolt 8 instead of the flange portion 16, then the above "flange portion diameter" may be replaced by a washer diameter.

Figure 3:
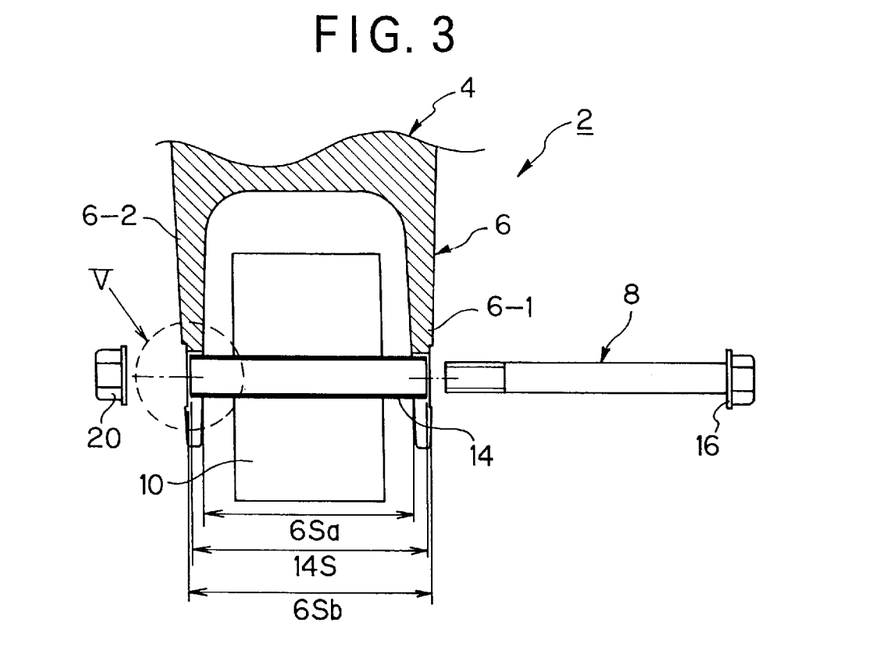
FIG. 3 is a schematic cross-sectional view showing the engine-mounting bracket in a state of a bush being assembled on a bracket.

Turning now to FIG. 3, the bush 10 is shown fixed onto the periphery of the sleeve 14 whose length 14S is greater than distance 6Sa between inner surfaces of the supporting arm portions 6, but is smaller than distance 6Sb between the machined surfaces or outer surfaces of the supporting arm portions 6.

Reference numeral 20 denotes the aforesaid nut to be in threading engagement with the bolt 8; 22 denotes a first attachment bolt for fastening the bracket 4 to one of the engine (not shown) and the vehicle body (not shown); and, 24 is a second attachment bolt for securing the bush 10 to the other of the above.

The operation of the first embodiment will now be described.

As illustrated in FIG. 3, when the bracket 4 and the bush 10 are assembled together, then the sleeve 14, which is rigidly secured to the bush 10, is inserted with pressure into the cutout portions 12 which are defined at the first and second arm portions 6-1 and 6-2 of the bracket 4.

Figure 4:
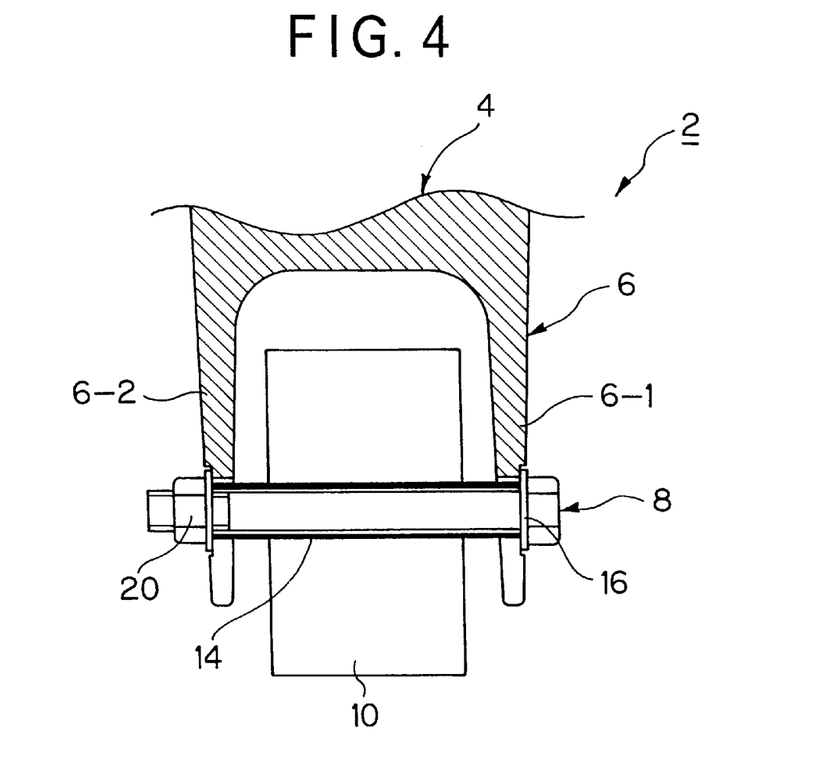
FIG. 4 is a schematic cross-sectional view taken along line IV—IV of FIG. 2.
Figure 5:
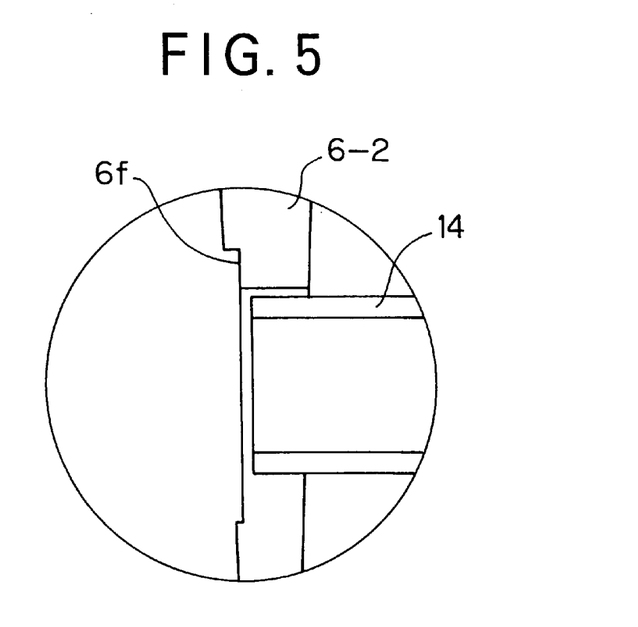
FIG. 5 is a schematic enlarged cross-sectional view taken along line V—V of FIG. 3.

Then, the fixing bolt 8 is driven through the inside of the sleeve 14. As illustrated in FIG. 4, the nut 20 is brought into threading engagement with the bolt 8. The bush 10 is thereby secured onto the bracket 4.

In this way, the cutout portions 12, which are formed at the first and second arm portions 6-1 and 6-2 of the supporting arm portions 6, eliminate conventional practice of hole matching, and thus enhance convenience of assembly. This is advantageous in view of practical use.

In addition, since the engine-mounting bracket 2 can be cast, then the bracket 2 can easily be manufactured with fewer components at reduced costs. This is advantageous from an economical viewpoint.

Further, since cutout width 18 of the cutout portions 12 is rendered greater than diameter 14D of the cylindrical sleeve 14 disposed in the bush 10, but is made smaller than diameter 16D of the flange portion 16 formed on the bolt 8, then such cutout width 18 enables the sleeve 14 to be positioned at the cutout portions 12. In addition, cutout width 18 obviates the likelihood that the bolt 8 breaks loose and falls off the cutout portions 12. This is advantageous in view of practical use.

Yet further, since the bush 10 is fixedly positioned on the periphery of the sleeve 14 whose length 14S is greater than distance 6Sa between the inner surfaces of the supporting arm portions 6, but is smaller than distance 6Sb between the outer surfaces or machined surfaces of the supporting arm portions 6, then the sleeve 14 can be securely positioned at the cutout portions 12, with consequentially enhanced convenience of assembly. In addition, end surfaces of the sleeve 12 and the outer surfaces of the supporting arm portions 6 are machined, thereby providing improved accuracy in dimension. For example, a difference between the aforesaid distance 6Sb and length 14S is minimized, whereby deflection at the supporting arm portions 6 can be minimized.

FIGS. 6–9 illustrate a second embodiment. In this embodiment, the same reference characters are hereinafter used for features identical in function to those described in the first embodiment.

Figure 6:
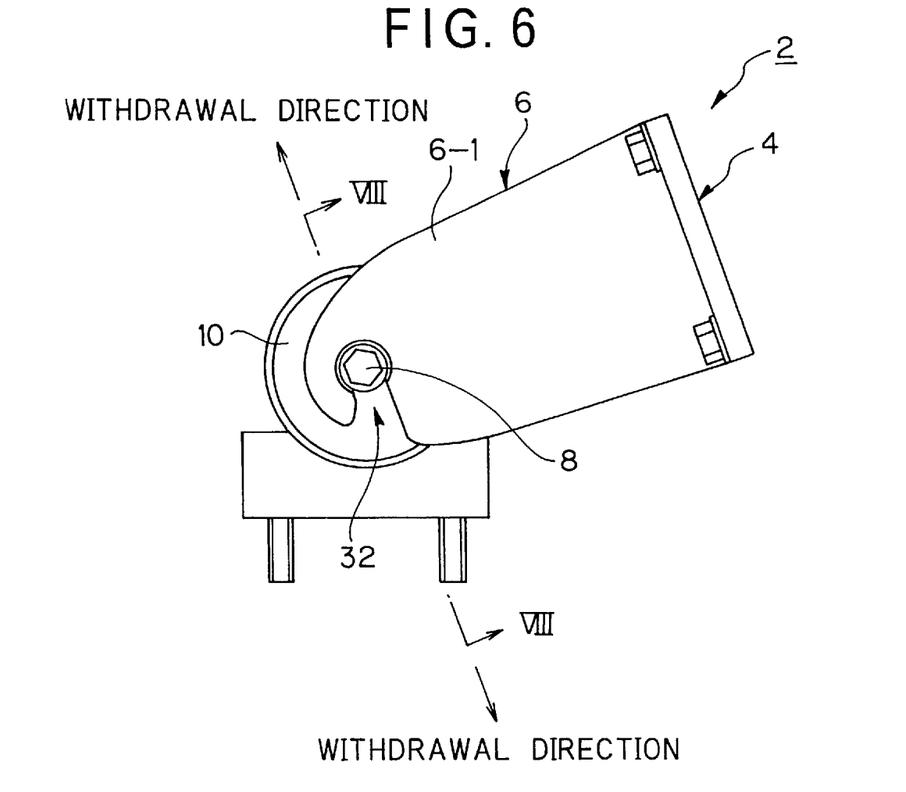
FIG. 6 is a right side view illustrating an engine-mounting bracket according to a second embodiment.

The second embodiment is characterized in that, when the engine-mounting bracket 4 is provided with cutout portions 32 at supporting arm portions 6 for fixing a bush thereto, the cutout portions 32 are cut away in the same direction as a withdrawal direction.

More specifically, similar to the first embodiment, the supporting arm portions 6 are cast in a metallic material such as iron or aluminum, and are formed into a U-shaped configuration in cross-section. The supporting arm portions 6 have plate-shaped, first and second arm portions 6-1 and 6-2 formed at both end portions thereof in an opposed relationship to one another. As illustrated in FIG. 6, the cutout portions or slots 32 are formed in the same direction as the withdrawal direction. In other words, the cutout portions 32 are defined so as to be perpendicular to an outward extending direction of the first and second arm portions 6-1 and 6-2. The cutout portions 32 are defined by being cut into the first and second arm portions 6-1 and 6-2 at a downward slant in the FIG. 6 embodiment.

Similar to the first embodiment, the cutout portions 32 have a cutout width greater than a diameter of a cylindrical sleeve 14 but smaller than a diameter of a flange portion 16. The sleeve 14 is disposed in a bush 10. The flange portion 16 is formed on a fixing bolt 8.

Again, similar to the first embodiment, the bush 10 is rigidly mounted on the periphery of the sleeve 14 which has a length 14S greater than the distance 6Sa between the inner surfaces of the supporting arm portions 6, but smaller than distance 6Sb between the outer surfaces of the arm portions 6.

Figure 7:
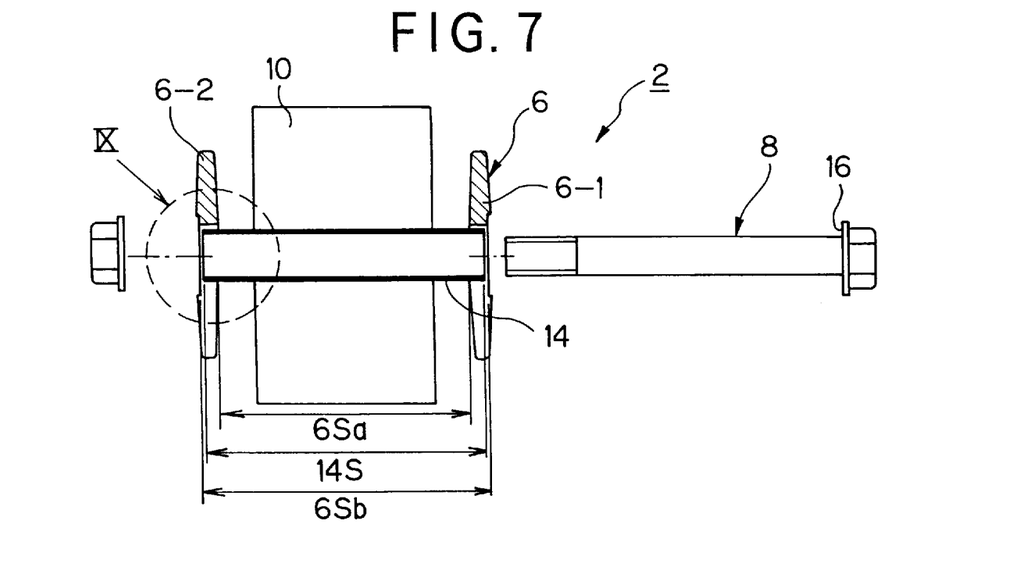
FIG. 7 is a schematic cross-sectional view illustrating the engine-mounting bracket in a state of a bush being assembled on a bracket.
Figure 8:
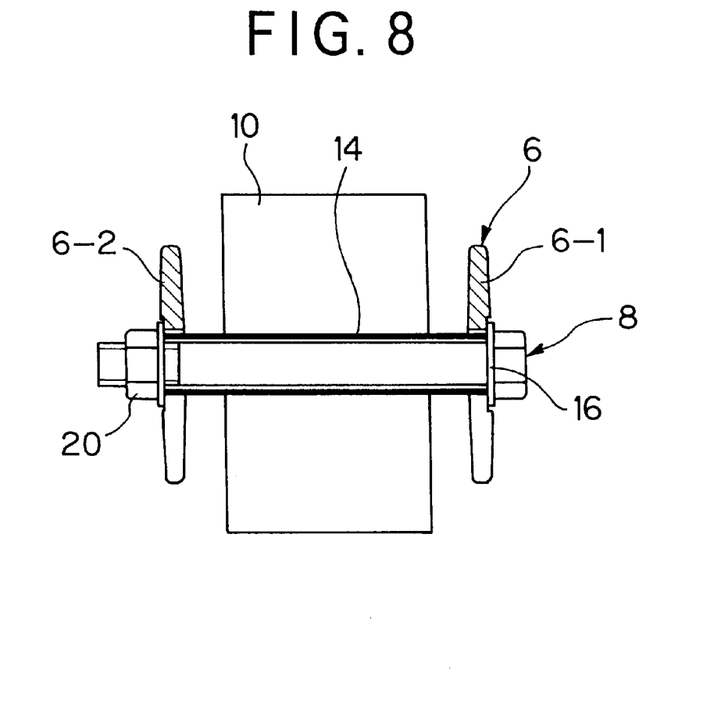
FIG. 8 is a schematic enlarged cross-sectional view taken along line VIII—VIII of FIG. 6.
Figure 9:
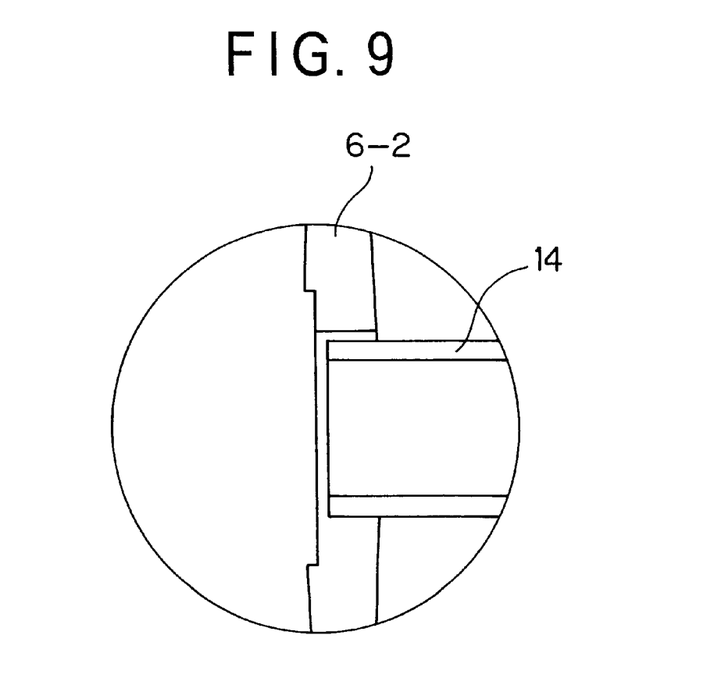
FIG. 9 is a schematic enlarged cross-sectional view taken along line IX—IX of FIG. 7.

As shown in FIG. 7, when the bracket 4 and the bush 10 are assembled together, the sleeve 14, which is fixed to the bush 10, is pushed into the cutout portions 32 which are formed at the first and second arm portions 6-1 and 6-2 of the bracket 4. Then, the bolt 8 is inserted through the inside of the sleeve 14. As illustrated in FIG. 8, a nut 20 is driven into threading engagement with the bolt 8. As a result, the bush 10 can be assembled on the bracket 4.

In this way, the cutout portions 32, which are defined at the first and second arm portions 6-1 and 6-2 of the supporting arm portions 6, obviate the need for the conventional practice of hole matching. As a consequence, enhanced convenience of assembly is provided, which is advantageous in view of practical use, similarly to the first embodiment.

In addition, since the supporting arm portions 6 of the engine-mounting bracket 2 are castable, the bracket 2 can easily be fabricated with fewer components at reduced costs, which is advantageous from an economical viewpoint, similarly to the first embodiment.

Further, since cutout width 18 of the cutout portions 32 is greater than diameter 14D of the cylindrical sleeve 14 provided in the bush 10, but is smaller than diameter 16D of the flange portion 16 formed on the bolt 8, then the aforesaid cutout width allows the sleeve 14 to be positioned at the cutout portions 32. In addition, the above cutout width obviates the possibility that the bolt 8 breaks loose and falls off the cutout portions 32, which is advantageous in view of practical use, similarly to the first embodiment.

Yet further, since the bush 10 is fixed onto the periphery of the sleeve 14 whose length 14S is greater than distance 6Sa between the inner surfaces of the supporting arm portions 6, but is smaller than distance 6Sb between the outer surfaces or removed surfaces of the supporting arm portions 6, then the sleeve 14 can reliably be positioned at the cutout portions 32, with concomitantly enhanced convenience of assembly, similarly to the first embodiment. In addition, end surfaces of the sleeve 14 and the outer surfaces of the supporting arm portions 6 are machined surfaces, thereby providing improved accuracy in dimension. For example, a difference between the aforesaid distance 6Sb and length 14S is minimized, whereby deflection at the supporting arm portions 6 can be minimized.

It is to be noted that the present invention is not limited to the above-described first and second embodiments, but is susceptible to various changes and modifications.

Figure 10:
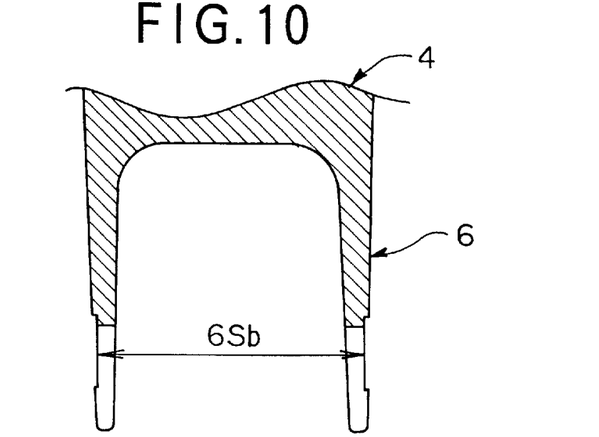
FIG. 10 is a schematic cross-sectional view illustrating a bracket of an engine-mounting bracket according to another embodiment.
Figure 11:
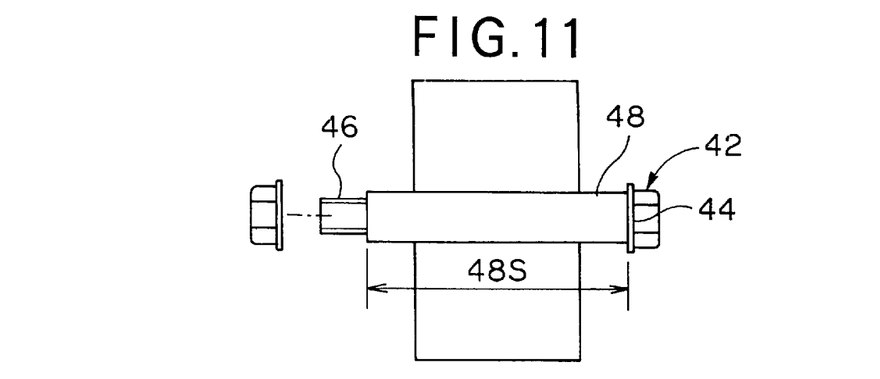
FIG. 11 is a front view showing a state in which a bush is fixed to a fixing bolt.
Figure 12:
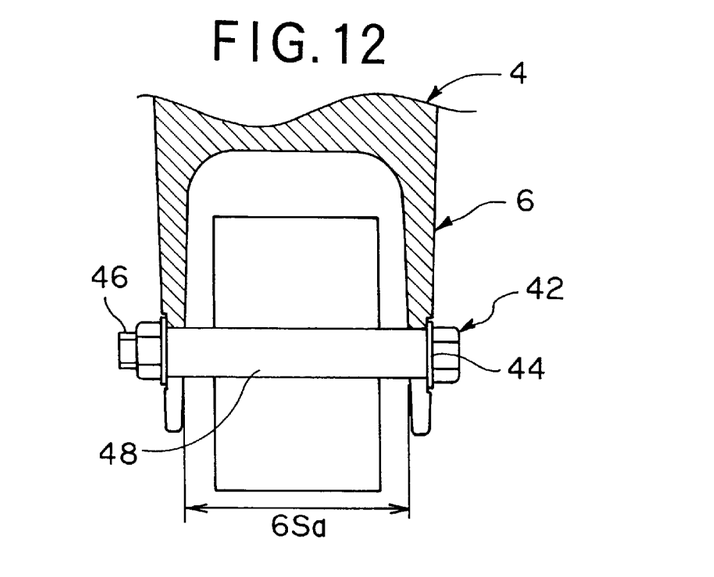
FIG. 12 is a schematic cross-sectional view showing the engine-mounting bracket in a state of the bush being assembled on the bracket.

For example, in the first embodiment, the bush 10 is fixed onto the periphery of the sleeve 14, and the cutout portions 12, which are formed at the supporting arm portions 6 of the bracket 4 for fixing the bush to the bracket 4, permit the bush 10 to be fixed to the bracket 4 between the supporting arm portions 6 by means of the fixing bolt 8. Now, as illustrated in FIGS. 10–12, a fixing bolt 42 may be formed into a shape such that an incompletely threaded portion 48 is provided between a flange portion 44 at one end of the bolt 42 and a threaded portion 46 at the other end thereof. That is, the incompletely threaded portion 48 may be substituted for the sleeve.

More specifically, when the bolt 42 is formed by the flange portion 44, the threaded portion 46, and the incompletely threaded portion 48, then the incompletely threaded portion 48 is formed in such a manner that length 48S of the threaded portion 48 is greater than distance 6Sa between the inner surfaces of the supporting arm portions 6, but is smaller than distance 6Sb between the outer surfaces of the supporting arm portions 6, as illustrated in FIGS. 10 and 11.

As shown in FIG. 11, when the bracket 4 and the bush are assembled together, the bush is fixed to a peripheral surface portion of the incomplete threaded portion 48. As illustrated in FIG. 12, the bolt 42 having the bush fixed thereto is inserted with pressure into the cutout portions which are formed at the first and second arm portions 6-1 and 6-2 of the bracket 4. Then, a nut is driven into threading engagement with the threaded portion 46 of the bolt 42. In this way, the bush can be assembled onto the bracket 4.

In short, the cutout portions 12 defined at the supporting arm portions 6 obviate the need for conventional practice of hole matching, and thus enhance convenience of assembly. This is advantageous in view of practical use. In addition, the castability of the supporting arm portions 6 provides fewer components, easy manufacture, and reduced costs. This is advantageous in an economical viewpoint. Furthermore, the use of the incompletely threaded portion 48 of the bolt 42 in place of the sleeve provides fewer components, which leads to enhanced convenience of assembly.

As detailed above, the engine-mounting bracket arrangement positioned between an engine and a vehicle body according to the present invention includes a bracket, which is fitted to one of the engine and the vehicle body, and a bush which is attached to the other of the engine and the vehicle body. The bush is fixedly secured to the bracket between supporting arm portions of the bracket by means of a fixing bolt. In addition, the bracket has cutout portions formed at the supporting arm portions for fixing the bush to the bracket. As a result, the cutout portions defined at the supporting arm portions eliminate conventional hole-matching practice, and thus provides enhanced convenience of assembly. This is advantageous in view of practical use. In addition, the castability of the engine-mounting bracket realizes fewer components, easy manufacture, and reduced costs. This is advantageous in an economical viewpoint.

The embodiments of the invention in which an exclusive property or privilege is claimed are defined as follows:

1. An engine-mounting bracket disposed between an engine and a vehicle body, comprising:

a generally U-shaped bracket adapted to be attached to one of said engine and said vehicle body, said bracket having a pair of generally parallel outwardly extending supporting arm portions which are spaced from one another and which each define thereon inner and outer surfaces, said arm portions each having a slotlike cutout opening inwardly from a peripheral edge thereof;

an elongate sleeve adapted to be received in and extend between said cutouts, said sleeve having a diameter less than the width of said slotlike cutouts and a length greater than the distance between said inner surfaces of said spaced apart arm portions but less than the distance between said outer surfaces of said spaced apart arm portions, whereby end portions of said sleeve are seated in said slotlike cutouts, a bush adapted to be attached to the other of said engine and said vehicle body, said bush being fixed to a periphery of said sleeve, said bush having a length less than the distance between said inner surfaces so that said bush is positioned between said supporting arm portions of said bracket when said slotlike cutouts receive said sleeve; and a fixing bolt extending through said sleeve for fixing said sleeve to said bracket, said fixing bolt having at one end thereof a flange portion with a diameter greater than said width of said slotlike cutouts and at the other end thereof a removable nut having a diameter greater than the width of said slotlike cutouts, the outer surfaces being engaged between the flange portion and the nut.

2. An engine-mounting bracket according to claim 1, wherein said fixing bolt has a nonthreaded portion formed between said flange portion at one end of said bolt and a threaded portion at the other end of said bolt, and said nonthreaded portion is integral with said sleeve.

3. An engine-mounting bracket according to claim 1, wherein said slotlike cutouts respectively extend into said arm portions perpendicular to the outwardly extending direction of said arm portions.

4. An engine-mounting bracket according to claim 1, wherein said slotlike cutouts have a closed end; and recesses are respectively formed in said outer surfaces of said arm portions and surround said closed ends of said slotlike cutouts, said recesses respectively receiving said flange portion and said nut therein to secure said fixing bolt to said arm portions.

* * * * *